United States Patent [19]

Ushiku

[11] Patent Number: 4,661,721

[45] Date of Patent: Apr. 28, 1987

[54] CLOCK DRIVER DISTRIBUTION SYSTEM IN A SEMICONDUCTOR INTEGRATED CIRCUIT DEVICE

[75] Inventor: Yukihiro Ushiku, Yokohama, Japan

[73] Assignee: Kabushiki Kaisha Toshiba, Kawasaki, Japan

[21] Appl. No.: 767,847

[22] Filed: Aug. 21, 1985

[30] Foreign Application Priority Data

Sep. 29, 1984 [JP] Japan ................. 59-204451

[51] Int. Cl.[4] ................. H03K 5/15; H03K 19/01
[52] U.S. Cl. ................. 307/269; 307/270; 307/303; 328/105
[58] Field of Search .......... 307/242, 243, 270, 219, 307/269, 303; 328/103, 105

[56] References Cited

U.S. PATENT DOCUMENTS

| | | | |
|---|---|---|---|
| 3,104,330 | 9/1963 | Hamilton | 328/105 |
| 3,479,603 | 11/1969 | Overstreet | 307/219 |
| 3,751,591 | 8/1973 | Radcliffe et al. | 328/105 |
| 4,384,287 | 5/1983 | Sakuma | 307/270 |
| 4,504,745 | 3/1985 | Spence et al. | 307/269 |

Primary Examiner—John S. Heyman
Attorney, Agent, or Firm—Oblon, Fisher, Spivak, McClelland & Maier

[57] ABSTRACT

A semiconductor integrated circuit device wherein a plurality of clock signal lines provided with a clock signal are drawn out independently from the respective output terminals of a plurality of divided clock drivers, the clock signal lines being connected together by a common connecting line.

1 Claim, 11 Drawing Figures

F I G. 1
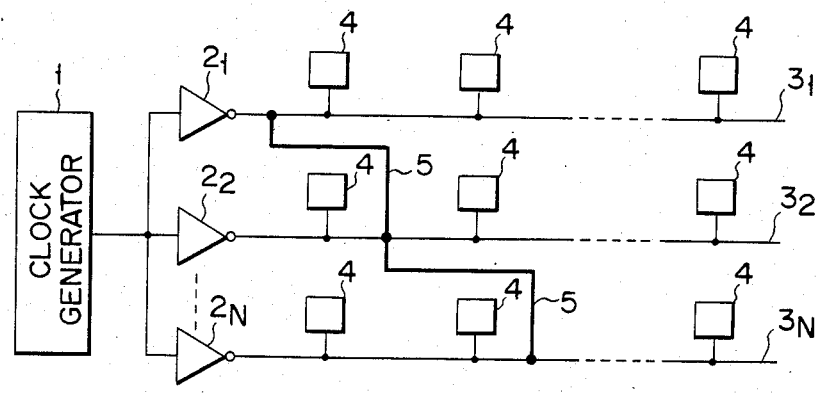
F I G. 2
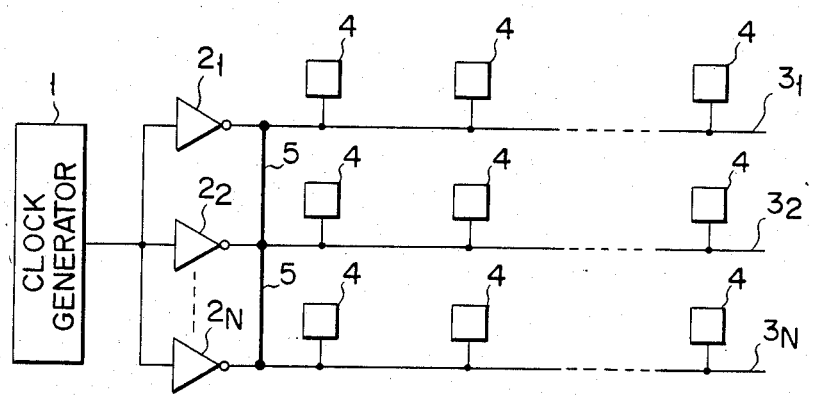

F I G. 3
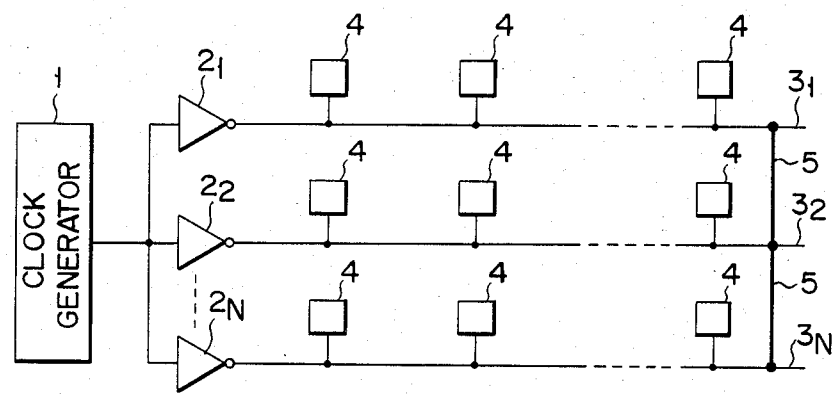

CLOCK DRIVER DISTRIBUTION SYSTEM IN A SEMICONDUCTOR INTEGRATED CIRCUIT DEVICE

BACKGROUND OF THE INVENTION

This invention relates to a semiconductor integrated circuit device, and, more particularly, to the improvement of the clock driver section of a large scale integrated circuit (abbreviated as LSI).

With reference to the LSI, a large number of gate circuits and flip-flop circuits are operated in synchronization with a clock signal. Consequently, a clock signal line which extends all over an LSI chip is connected to numerous load circuits. The total capacity of all the load circuits amounts to as much as scores of hundreds of [pF] units. A clock driver for actuating a clock signal line connected to such a large capacity load must have a large drivability.

When a clock driver having a large drivability is set in the LSI, the following difficulties are encountered.

(1) A large current change appears in the clock driver section leading to the occurrence of local switching noises, potential changes in a power line, and also a prominent flow of substrate current. As a result, drawbacks arise in that the circuit malfunctions, and the CMOS-LSI becomes subject to breakage resulting from latch-up phenomenon.

(2) It has been proposed to lay a broad power line and ground line near the clock driver as a means of resolving the above-mentioned problems. However, this process presents difficulties in the drawing of a pattern layout on the LSI. Particularly with automatic placement and routing by a computer, the wiring width is generally restricted, making it difficult to locally broaden a power line.

(3) A clock pulse is supplied from a single clock driver to a plurality of load circuits distributed over the LSI chip substrate. Consequently, signal lines around the clock driver are extremely congested, another factor presenting difficulties in defining a pattern layout.

For the resolution of the aforementioned drawbacks, it has hitherto been attempted to distribute a plurality of clock drivers generating the same clock signal over a plurality of points on the LSI chip substrate. This process can, indeed, resolve the problems described in the foregoing items (1) to (3). The mere distribution of the clock drivers, however, is itself accompanied by a drawback related to the clock skew.

Description may now be made of this problem with reference to the accompanying FIG. 9. In the example of FIG. 9, one output signal from the clock generator 21 is supplied to two divided clock drivers $22_1$, $22_2$. These clock drivers $22_1$, $22_2$ supply clock signals $CL_1$, $CL_2$, respectively, to their corresponding clock signal lines $23_1$, $23_1$. Though the two clock signals $CL_1$, $CL_2$ are issued at the same time, the clock drivers $22_1$, $22_2$ indicate different delay properties, depending on the load condition.

FIG. 10 indicates the waveforms of the clock signals $CL_1$, $CL_2$. The characters $t_{p1}$, $t_{p2}$ represent the length of time required for the clock signals $CL_1$, $CL_2$, respectively, to have their logic data converted from "1" to "0". A difference $\Delta t_p$ between the two lengths of time denote a clock skew. This clock skew adversely affects the operation of the subject semiconductor integrated circuit device.

In this connection, reference is made to FIG. 11, showing the operation of a shift register comprising a plurality of successively connected J-K flip-flop circuits. The flip-flop circuit $24_1$ of the nth order is operated by the clock signal $CL_1$ of FIG. 10. The flip-flop circuit $24_2$ of the n+1th order, and the flip-flop circuit $24_3$ of the n+2th order are operated alike by the clock signal $CL_2$ of FIG. 10. If the length of time required for the negative edge trigger type flip-flop circuit of FIG. 10 to have its logic data changed from "1" to "0" happens to be shorter than the aforesaid clock skew $\Delta t_p$, then the flip-flop circuit $24_1$ of the nth order has its condition changed before the flip-flop circuit $24_2$ of the n+1th order is triggered. As a result, incorrect data is transmitted to the flip-flop circuit $24_2$ of the n+1th order. If, therefore, a clock driver is simply divided into a plurality of components, the semiconductor integrated circuit device will malfunction, causing, for example, incorrect data to be transmitted due to a different load condition of the clock driver.

SUMMARY OF THE INVENTION

It is, accordingly, the object of this invention to provide a semiconductor integrated circuit device which comprises a plurality of divided clock drivers, and which has resolved the problem of the aforementioned clock skew.

To attain the above-mentioned object, this invention provides a semiconductor integrated circuit device wherein one output signal from a clock generator is supplied to a plurality of clock signal lines, having one or more load circuits, through a plurality of divided clock drivers. The plural clock signal lines are connected together by a common connecting line.

BRIEF DESCRIPTION OF THE DRAWINGS

FIG. 1 is an equivalent circuit of an LSI device according to one embodiment of this invention;

FIGS. 2 and 3 are the equivalent circuits of the LSI devices according to the other embodiments of the invention;

DETAILED DESCRIPTION OF THE PREFERRED EMBODIMENTS

Figure 4:
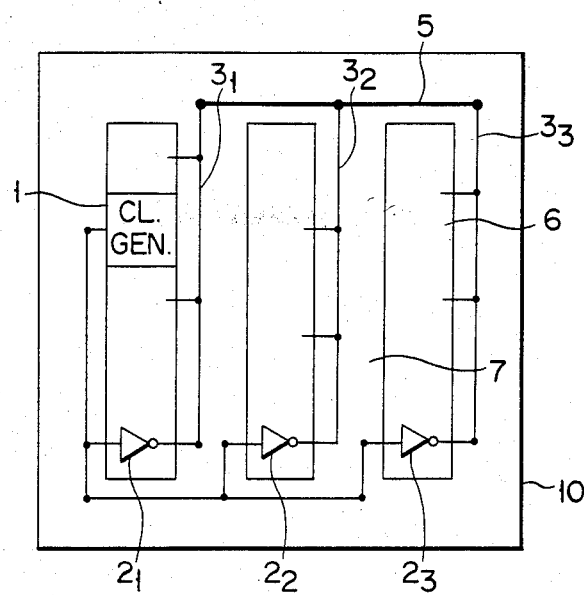
FIGS. 4 to 7 are typical plan views of a gate array provided with the semiconductor integrated circuit device of the invention.

FIG. 1 is an equivalent circuit of an LSI device according to one embodiment of this invention. This LSI device is formed on a semiconductor chip substrate (not shown) by the known manufacturing process. Reference numeral 1 denotes a clock generator. One output terminal of said clock generator 1 is connected to a plurality of clock drivers ($2_1$, $2_2$, ... $2_N$). These clock drivers are properly distributed over the surface of the LSI chip substrate. Reference numerals $3_1$, ... $3_N$ represent clock signal lines drawn out independently from the respective clock pulse driver output terminals. The clock signal lines 3 are connected to one or more load circuits 4, each of which has to be supplied with a clock signal. More specifically, a common clock signal is supplied to all load circuits 4 through the independent clock signal lines $3_1$–$3_N$. The clock signal lines $3_1$–$3_N$ are collectively connected by a common connecting line 5, said common connecting line 5 being metal wire in this embodiment. (For better understanding, said common connecting line 5 is shown in this and subsequent embodiments as a thick line.)

As described above, the independent clock signal lines $3_1$–$3_N$ are connected together by the common connecting line 5, thus equalizing the load conditions of the plural clock drivers 2. Consequently, clock signals issue from the respective clock drivers 2 without delay, thereby substantially eliminating the occurrence of the clock skew. Since, as described above, the plural clock drivers 2 are properly distributed over the surface of the chip substrate, it is possible to resolve various problems which might arise from large local current variations, were only a single clock driver provided.

It is advised that a circuit designer define the drivability of the entire clock driver 2 in consideration of the operation speed of the load circuits 4 connected to the clock signal lines 3 and subjected to the most rigid timing conditions, and also of the capacity of all the load circuits 4. Further, it is advised that the clock drivers be properly distributed in accordance with the power line width and the space on the surface of the LSI chip substrate, so that all the distributed drivers may have the drivability prescribed for an entire clock pulse driving unit. The above-mentioned arrangement will quickly resolve the difficulty of designing a circuit involving distributed clock drivers.

The clock signal lines may be connected by a common connecting line at any point on said clock signal lines. If all the clock signal lines are connected together by the shortest common connecting line, no appreciable increase will result in the wire capacity. If the distributed clock drivers have a sufficient driving power in the aggregate, no consideration has to be given to any increase in the wiring capacity resulting from the provision of the common connecting line. Therefore, automatic placement and routing by computer can easily be applied.

FIGS. 2 and 3 show the LSI devices embodying this invention, wherein the common connecting line for connecting the respective clock signal lines are set at different points from those indicated in FIG. 1. In FIG. 2, the common connecting line 5 is provided right near the output terminals of the clock drivers $2_1$–$2_N$. In FIG. 3, the common connecting line 5 is set at a point furthest away from the respective clock drivers $2_1$–$2_N$ in a relationship entirely opposite to that of FIG. 2. Further, it is possible to connect clock signal lines at several points by the common connecting line 5 in so far as an increase in the load capacity can be overlooked; for example, to combine the embodiments of FIGS. 2 and 3.

The common connecting line 5 for connecting all the clock signal lines together need not be prepared from a metal, but may be formed of, for example, a polycrystalline silicon layer deposited on the chip substrate, or an impurity doped layer formed in the chip substrate.

FIG. 4 is a plan view of a CMOS gate array to which the semiconductor integrated circuit device of this invention is applied. A plurality of CMOS cell arrays 6 are mounted on the chip substrate 10. Interstices between the respective cell arrays 6 constitute wiring regions 7. A clock generator 1 is constituted by a plurality of CMOS cells involved in each cell array 6. Clock drivers $2_1$, $2_2$, $2_3$ are constituted by one or more CMOS cells provided at one end of each cell array 6. First Al wires extend in X direction parallel with the cell array 6. Second Al wires extend in Y direction perpendicularly intersecting said Y direction. The clock signal lines $3_1$, $3_2$, $3_3$ extending from the corresponding clock drivers $2_1$, $2_2$, $2_3$ are formed of the first Al wire layer. A common connecting line 5 connecting the clock signal lines $3_1$, $3_2$, $3_3$ together is prepared from a second Al layer and lies furthest from the clock drivers $2_1$, $2_2$, $2_3$.

Figure 5:
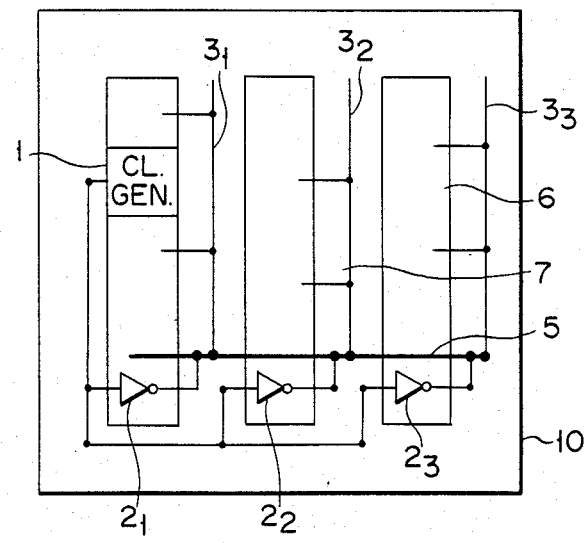
Figure 6:
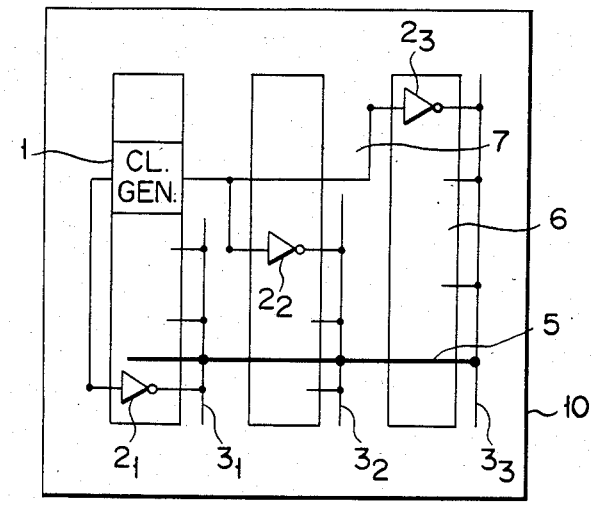
Figure 7:
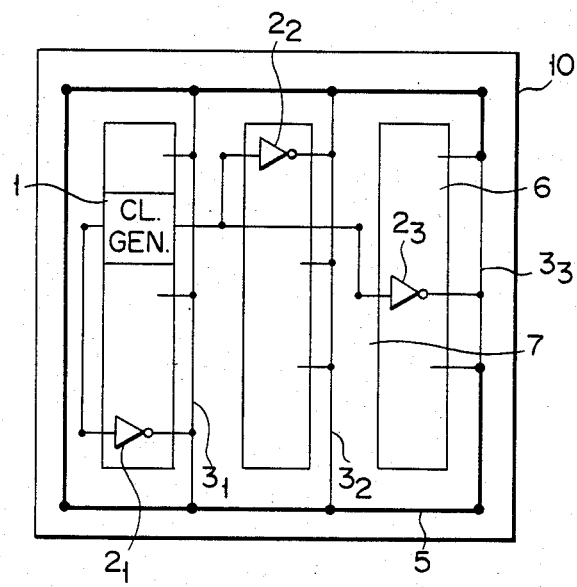

FIGS. 5 to 7 indicate a CMOS gate array modified from the embodiment of FIG. 4. Referring to FIG. 5, a common connecting line 5 connecting the clock signal lines $3_1$, $3_2$, $3_3$ together is prepared from a second Al wire layer and lies close to the output terminals of the clock drivers $2_1$, $2_2$, $2_3$. In FIG. 6, the clock driver $2_1$ is set in the lowest position of a first cell array; the clock pulse driver $2_2$ is positioned at the midpoint of a second cell array; and the clock pulse driver $2_3$ lies in the uppermost position of a third cell array. In the case of FIG. 6, too, a common connecting line connecting the clock signal lines $3_1$, $3_2$, $3_3$ together is prepared from a second Al wire layer. In FIG. 7, a common connecting line connecting the clock signal lines $3_1$, $3_2$, $3_3$ extends in both X and Y directions so as to substantially surround the region in which the cell arrays 6 are formed.

Figure 8:
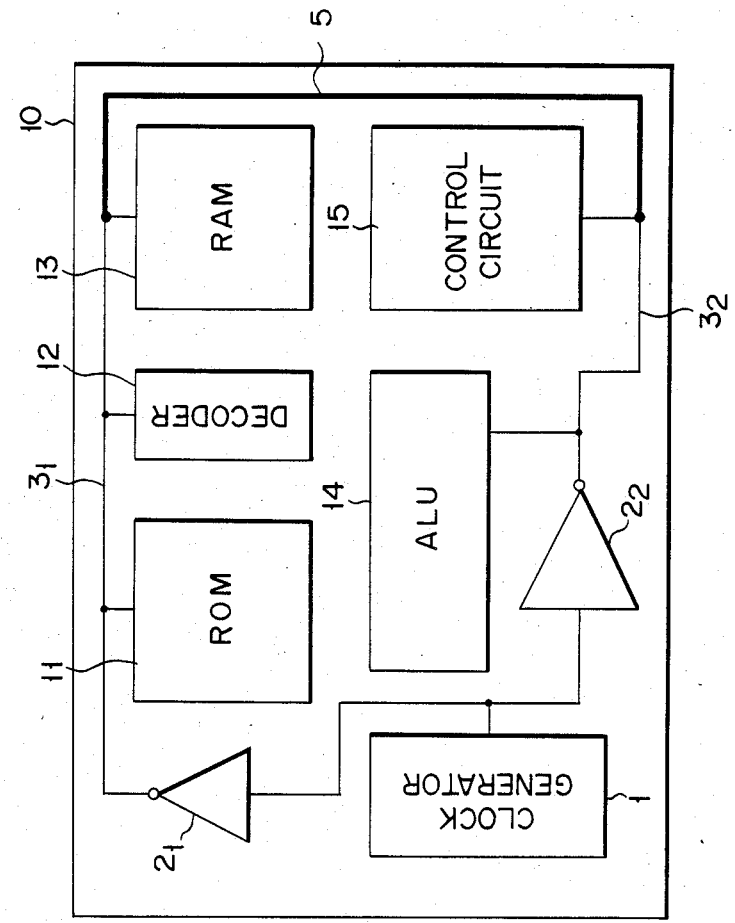
FIG. 8 is a plan view of a certain logic LSI device possessed of a memory function to which the semiconductor integrated circuit device of the invention is applied.
Figure 9:
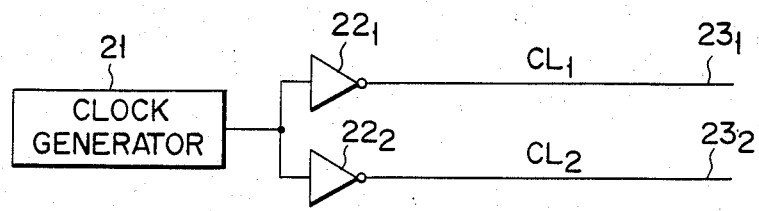
FIG. 9 shows an equivalent circuit indicating the fundamental arrangement of divided clock drivers type LSI device.
Figure 10:
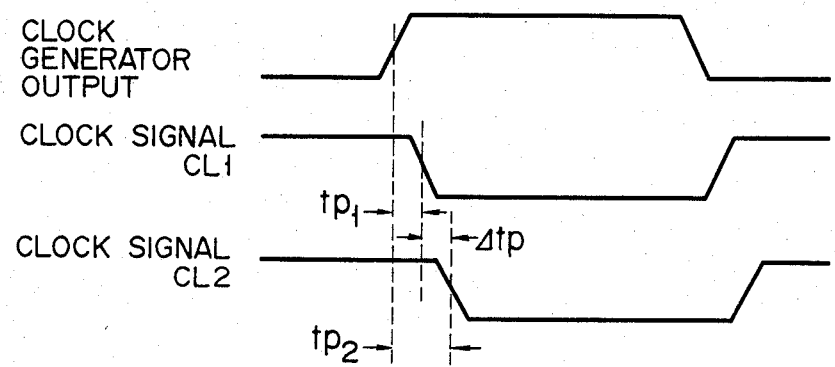
FIGS. 10 and 11 are illustrations given to explain the clock skew problem which may occur in FIG. 9.
Figure 11:
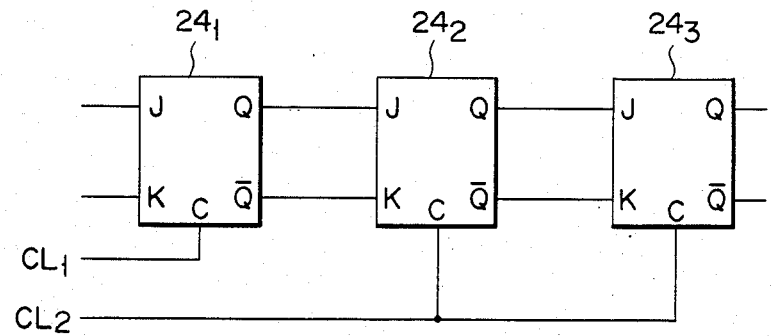

FIG. 8 is a plan view of an LSI device, according to another embodiment of this invention, which is provided with a memory function. Integrally formed on a chip substrate 10 are ROM (read only memory) 11, RAM (random access memory) 13, decoder 12, ALU (arithmetic logic unit) 14 and control circuit 15. A clock generator 1 which transmits a clock signal to said circuit elements is set in the corner of the chip substrate 10. Reference numerals $2_1$, $2_2$ represent divided clock drivers. One clock driver $2_1$ is intended to supply a clock signal to ROM 11, RAM 13 and decoder 12. This clock driver $2_1$ has a relatively small drivability. The other clock driver $2_2$ is intended to supply a clock signal to ALU 14 and control circuit 15, and has a greater drivability than the clock driver $2_1$. These clock drivers $2_1$, $2_2$ are set in the vacant regions of the chip substrate 10. The clock signal line $3_1$ drawn from the output terminal of the clock driver $2_1$, and the clock signal line $3_2$ extending from the output terminal of the clock driver $2_2$, are connected together by a common connecting line 5 formed in an elongated vacant area extending along part of the periphery of the chip substrate 10. Even the LSI device according to the embodiment of FIG. 8 can effectively eliminate the clock skew, thereby ensuring a reliable logic operation.

What is claimed is:

1. A semiconductor large scale integrated circuit subject to clock skewing due to unbalanced current demands therein comprising:
    a clock generator;
    a plurality of clock drivers connected to one output terminal of said clock generator;
    a plurality of clock signal lines drawn out independently from the respective output terminals of said clock drivers;
    a plurality of different current demand load circuits supplied with clock signals through the corresponding clock signal lines; and
    a common connecting line for connecting said plural clock signal lines together to thereby maintain synchronized clocking of said load circuits.

* * * * *